United States Patent
Dornajafi et al.

(10) Patent No.: US 9,627,694 B2
(45) Date of Patent: Apr. 18, 2017

(54) ZINC-WATER BATTERY AND SYSTEM

(71) Applicant: FlexEl, LLC, College Park, MD (US)

(72) Inventors: Mahsa Dornajafi, Adelphi, MD (US); Robert Benjamin Proctor, McLean, VA (US); Daniel A. Lowy, Woodbridge, VA (US); Zeynep Dilli, Hyattsville, MD (US); Martin C. Peckerar, Silver Spring, MD (US)

(73) Assignee: FLEXEL, LLC, College Park, MD (US)

( * ) Notice: Subject to any disclaimer, the term of this patent is extended or adjusted under 35 U.S.C. 154(b) by 969 days.

(21) Appl. No.: 13/666,173

(22) Filed: Nov. 1, 2012

(65) Prior Publication Data

US 2013/0108935 A1 May 2, 2013

Related U.S. Application Data

(60) Provisional application No. 61/554,597, filed on Nov. 2, 2011.

(51) Int. Cl.
*H01M 6/32* (2006.01)
*H01M 2/34* (2006.01)
*B82Y 30/00* (2011.01)

(52) U.S. Cl.
CPC ............... *H01M 6/32* (2013.01); *H01M 2/34* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 4,242,193 | A | 12/1980 | Moeglich |
| 4,830,588 | A | 5/1989 | Zentner |
| 2002/0082178 | A1 | 6/2002 | Besse et al. |
| 2009/0008268 | A1 | 1/2009 | Salathe et al. |
| 2010/0028766 | A1 | 2/2010 | Peckerar et al. |
| 2010/0159363 | A1 | 6/2010 | Swider-Lyons et al. |

OTHER PUBLICATIONS

PCT Notification of Transmittal of the International Search Report and the Written Opinion for Application No. PCT/US2012/062962 mailed Jan. 15, 2013, 10 pages.

*Primary Examiner* — Sarah A Slifka
(74) *Attorney, Agent, or Firm* — Finnegan, Henderson, Farabow, Garrett & Dunner, LLP.

(57) ABSTRACT

Systems for batteries or galvanic cells are disclosed. The system comprises a mixing chamber. The system further comprises a first reservoir, in fluid communication with a mixing chamber, the first reservoir configured to store a concentrated electrolyte. Additionally the system comprises a pump configured to pump a fluid into the mixing chamber. The system further comprises an electrochemical energy cell in fluid communication with the mixing chamber wherein the mixing chamber is configured to receive the fluid and concentrated electrolyte and mix the fluid and the concentrated electrolyte to produce a diluted electrolyte. Finally the system comprises the electrochemical energy cell configured to receive the diluted electrolyte, use the received diluted electrolyte for an electrochemical reaction and remove the used electrolyte solution from the cell.

27 Claims, 5 Drawing Sheets

ZINC-WATER BATTERY AND SYSTEM

CROSS-REFERENCE TO RELATED APPLICATIONS

This application claims the benefit of priority to U.S. Provisional Patent Application No. 61/554,597, entitled "Zinc-Water Battery and System," filed on Nov. 2, 2011, the disclosure of which is incorporated by reference. This application is related to co-pending application Ser. No. 12/505,823, entitled "Thin Flexible Rechargeable Electrochemical Energy Cell and Method of Fabrication" filed on Jul. 10, 2009, which is incorporated by reference herein in its entirety.

TECHNICAL FIELD

This disclosure is generally directed to electrochemical energy cells.

BACKGROUND

The operation of a battery, consisting of one or more galvanic cells, can be based on electrochemical reactions in which electrons are produced at one terminal and consumed at another terminal. The electrons can flow from the negative terminal of the battery to the positive terminal through an external load, connected between the positive and negative terminals, forming an electrical current produced by the battery.

SUMMARY

In general, one aspect of this disclosure relates to an electrochemical energy cell that involves a galvanic cell utilizing an electroactive metal anode, such as zinc, and a catalytic cathode, such that water acts as both the solvent for the electrolyte and a fuel for the cathode reaction. This galvanic cell can be operated over extended time periods by periodically supplying water from an external source to the system, with the possibility of mixing with a stock solution to create an aqueous electrolyte and/or a washing solution to remove precipitation formed on the cathode.

In one implementation a system is enclosed, the system comprises a mixing chamber. In this implementation, the system comprises a first reservoir in fluid communication with a mixing chamber, the first reservoir configured to store a concentrated electrolyte. The system further comprises a pump configured to pump a fluid into the mixing chamber. Additionally the system comprises an electrochemical energy cell in fluid communication with the mixing chamber wherein the mixing chamber is configured to receive the fluid and the concentrated electrolyte and to mix the fluid and the concentrated electrolyte to produce a diluted electrolyte. Finally, the system comprises the electrochemical energy cell configured to receive the diluted electrolyte, use the received diluted electrolyte for an electrochemical reaction and remove the used electrolyte solution from the cell.

In another implementation, the fluid pumped into the mixing chamber by the pump is fresh water. In another implementation the fluid is sea water or water containing salts, including but not limited to brackish water and sea water. In one implementation, the electrochemical energy cell is an acidic zinc-based galvanic cell. In another implementation the electrochemical energy cell is an active metal-based galvanic cell, wherein the active metal is magnesium, aluminum, tin, or zinc, or an alloy of the listed active metals.

In one implementation, the system comprises a flexible electrochemical energy cell through which fluids may be passed. In this implementation, the electrochemical energy cell is equipped with thin flexible electrodes, and contained within a flexible packaging material. The fluid may be flowed into and out of the electrochemical energy cell using cable glands to connect lengths of tubing. In one implementation, the flexible packaging material for the electrochemical energy cell is polyethylene. In another implementation the packaging material is polypropylene or a laminate containing an outer heat-resistant layer, a foil middle layer, and a heat-sealable inner layer.

In another implementation, the electrochemical cell comprises a cylinder through which fluids may be passed. The cathode and the cathode current collector are coated on the inside of a pipe or tube within the cylinder. In this implementation the anode is located in the center of the pipe or tube and the anode and cathode are separated by a porous separator. The electrolyte layer is located in the space between the cathode and the anode. In one implementation the electrolyte may be contained in the porous separator. In another implementation the electrolyte may be contained in the space between the anode and the cathode maintained by a spacer.

In one implementation, the system comprises a second reservoir in fluid communication with the mixing chamber, that contains a cleaning agent or a purging agent to be delivered to the electrochemical energy cell for a rinse of the cell, so as to, extend the operating time of the cell. In one implementation the cleaning agent is a solution of hydrochloric acid in water or seawater. In another implementation the cleaning agent is a solution of a solid organic acid in water or seawater.

DETAILED DESCRIPTION

In the following description, for the purposes of explanation, numerous specific details are set forth in order to provide a thorough understanding of various example embodiments. It will be apparent however, that some of these embodiments may be practiced without these specific details. Details of one or more embodiments are set forth in the accompanying drawings and the description below. Other features, objects, and aspects are apparent from the description and drawings, and from the claims.

A battery consisting of one or more galvanic cells can store energy over an extended period of time, when in a dormant state, until electrons flow from the negative to the positive terminal. The chemical reaction can be launched once an external electric load is connected between the positive and negative terminals. In most batteries, an electrical current can be created when one material oxidizes, or gives up electrons, while another material in contact with an electrolyte (an ionic conductor) becomes reduced (gains electrons). In the reverse process, when a rechargeable battery is connected to an electrical power source, the flow of electrons can be in the opposite direction, so that the material that oxidizes during discharge will gain electrons, while the other material will give up electrons. When the reactions proceeding in the cell are reversible, the battery is termed as a rechargeable or "secondary" battery. When the energy generation involves irreversible reactions, a non-rechargeable (single-use) battery is obtained, termed as a "primary battery."

Some embodiments may involve batteries, or galvanic cells, with all or some of the features described throughout this disclosure, which are designed and operated to be primary (non-rechargeable) batteries, but with an operation time significantly extended by supplying water to the battery from an external source (typically from an environmental source). In some embodiments, these batteries operate at low voltages (e.g., below 1.5 V), and may be environmentally safe in use and non-toxic.

The described embodiments herein may have different chemical designs and compositions for the battery. For example, there may be various additives (or combinations of the various additives) to the cathode material, anode material, and/or the electrolyte.

The terms "electrochemical energy cell," "electrochemical cell," or "galvanic cell," for example, can be used interchangeably.

Figure 1:
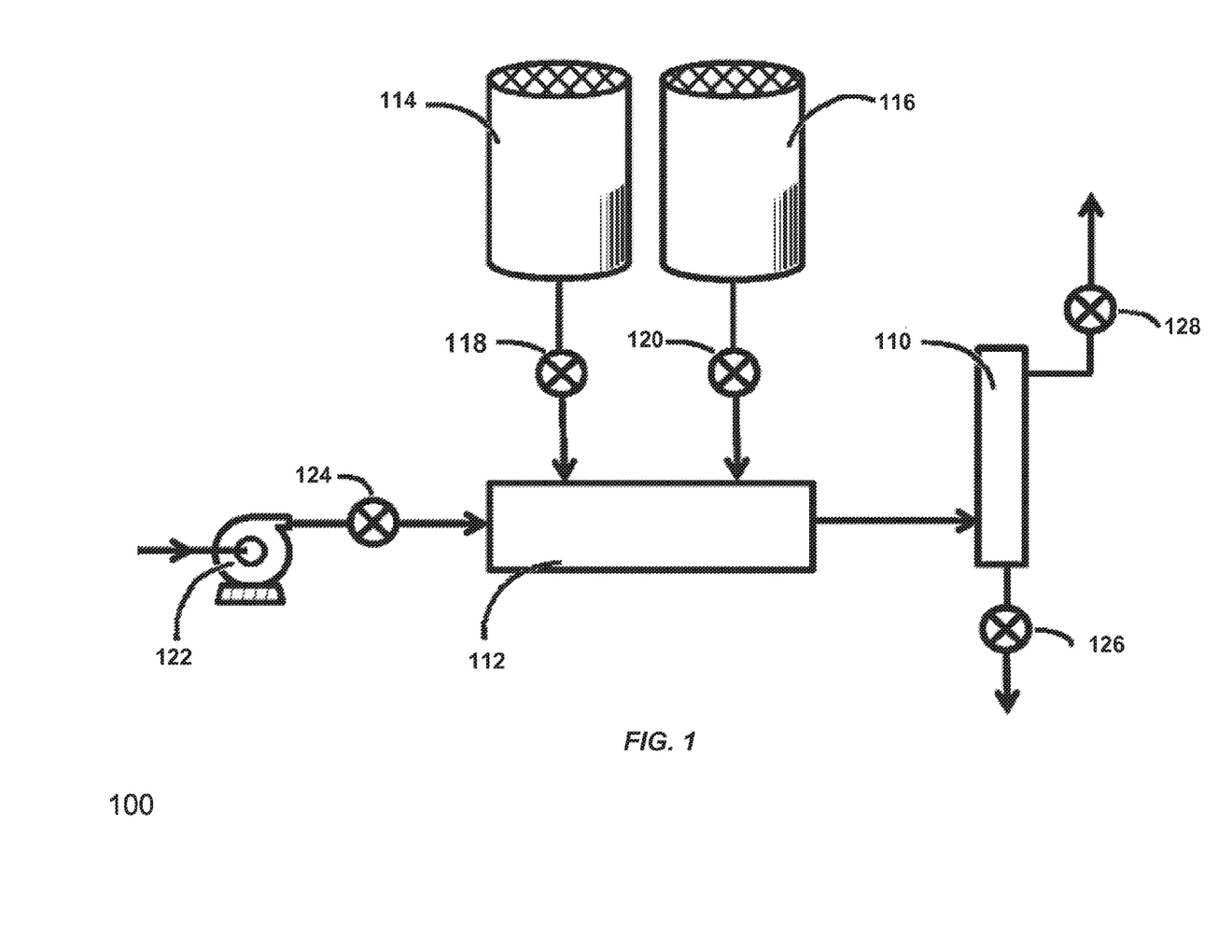
FIG. 1 illustrates an example of a battery system with a water injection device.

As an overview, FIG. 1 illustrates an example of a battery system 100 with a water injection device. A mixing chamber 112 for diluting the stock electrolyte is in fluid communication with a thin galvanic cell 110. A container 114 for the concentrated electrolyte solution (stock electrolyte), and a container 116 for the wash solution are both in fluid communication with the mixing chamber 112. The flow of the stock electrolyte into the mixing chamber 112 is controlled by valve 118. The flow of the wash solution into the mixing chamber 112 is controlled by valve 120. A pumping system 122 for introducing water from an external supply is in fluid communication with the mixing chamber 112. The flow of the water, introduced from an external source, by the pumping system 122, is controlled by valve 124. The thin galvanic cell 110 is in fluid communication with valve 126 that controls the drain of used electrolyte from the galvanic cell and with the gas vent 128 of the galvanic cell.

The described embodiments herein may have different physical designs for the cell. For example, there can be designs that use different current collector structures as a part of the anode or the cathode electrode unit, where numerous alternative physical structures can serve as an anode current collector that goes into the construction of the anode or as a cathode current collector that goes into the construction of the cathode.

The described embodiments herein may have various physical shapes for the cell. For example, FIGS. 2A and 2B describe a sandwich-like, single-layer cell; and FIG. 3 describes a cylindrical volumetric cell, where the cathode is the external electrode, hence, it has a larger surface area than the anode. Some cells may be submerged in electrolyte, e.g., in seawater, while others may be in surrounded by or in contact with the ambient atmosphere. Other designs or combinations of these designs are within the scope of this disclosure. A particular embodiment is a thin prismatic cell, which may also be flexible.

Figure 2A:
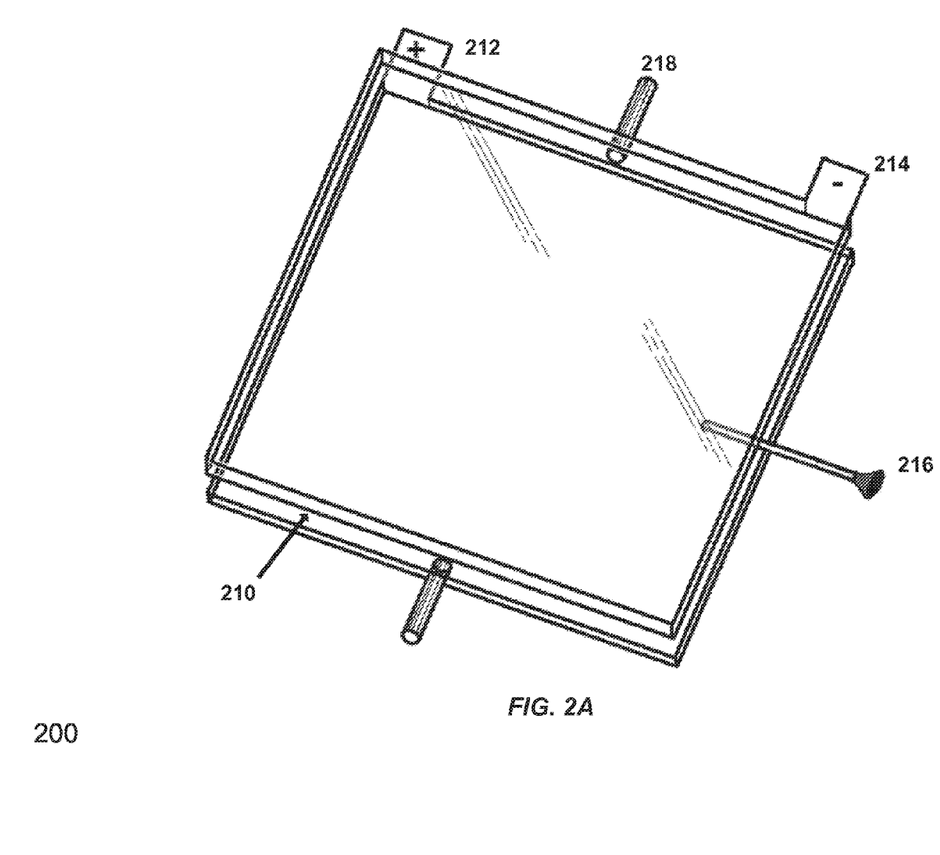
FIGS. 2A and 2B illustrate a flexible thin packaged galvanic cell, which can be sequentially replenished with electrolyte.
Figure 2B:
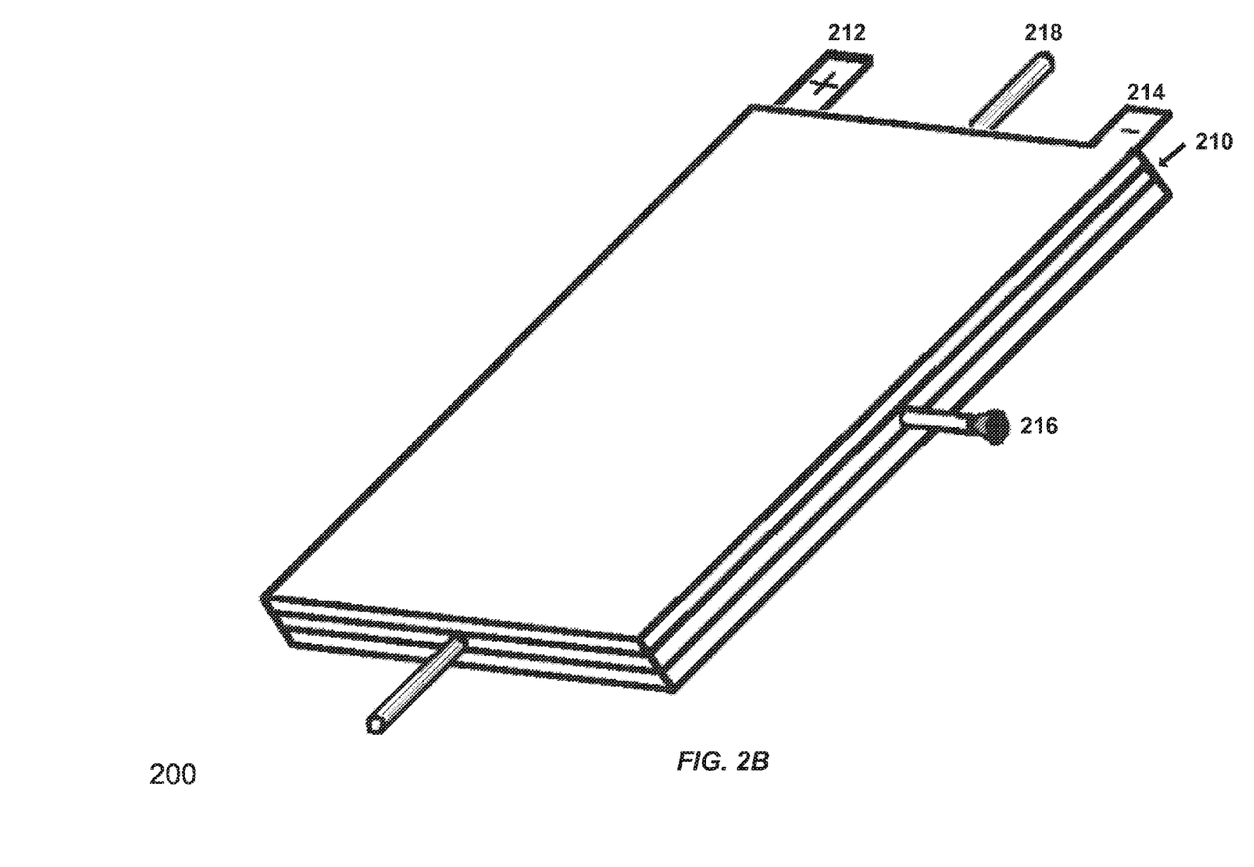

FIGS. 2A and 2B illustrate two views of a flexible thin packaged galvanic cell 200, which can be sequentially replenished with electrolyte as describe in the example battery system 100. The electrolyte body 210 is sandwiched between the cathode (positive electrode) 212 and the anode (negative electrode) 214. The electrolyte inlet 218 controls the flow of the electrolyte into the electrolyte body 210. The electrolyte and gas outlet 216 allows for the flow of the electrolyte and gas out of the electrolyte body 210.

Figure 3:
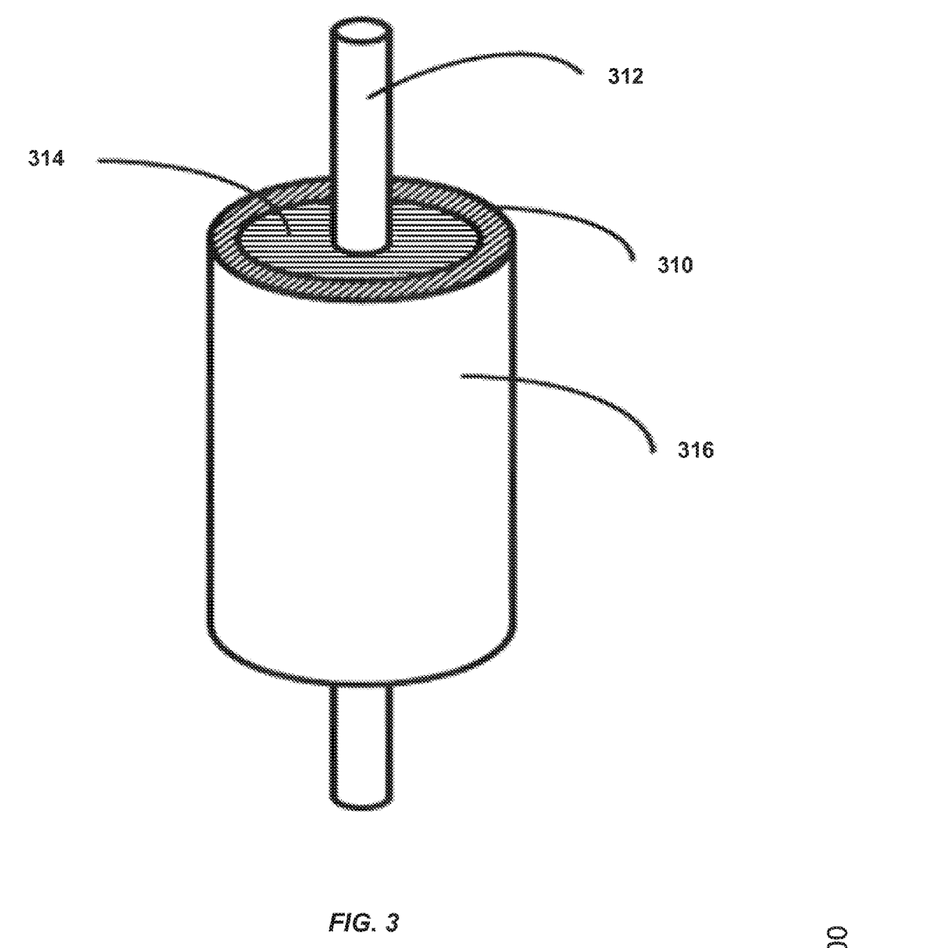
FIG. 3 illustrates a schematic of the cylindrical volumetric cell.

FIG. 3 illustrates a schematic of a cylindrical volumetric cell 300. The cell consists of a cathode (positive electrode) 310 in the form of a tube or pipe and an anode (negative electrode) 312 located in the center of the pipe or tube. The electrolyte layer 314 is contained in a porous separator in the area between the two electrodes. The cell is enclosed by external packing 316.

In some embodiments, a multiple-layer cathode structure (e.g., folded mesh, carbon veil, or layers of the same, as well as multiple-layer coatings on a single cathode current collector) may be used for adding charge capacity to the battery with increasing layer thickness of the active materials confined to the cathode. This multiple-layer cathode structure can yield higher rate capability and capacity for a given footprint than single layer cathodes.

As described in the example of the light-weight flexible thin-film zinc-ruthenium dioxide galvanic cell, a battery system suitable for being rejuvenated by addition of water to the cell can be designed. These cells can offer the highest specific charge storage capacity of any commercially available thin film cells (e.g., >10 mAh cm$^{-2}$). In these cells, any cell layers can be combined into any volumetric device, while keeping the high capacity characteristics. Neither zinc nor ruthenium (IV) oxide poses any health hazards. Hydrated ruthenium (IV) oxide is insoluble, even in acids, and cannot be carried as a toxin by the blood stream. During battery operation, the only change taking place in the oxide is a rearrangement of the hydration water, and the material is not consumed on discharge. Hence, these batteries are environmentally benign, and do not necessitate special shipment or disposal protocols. Therefore, they are suitable for being deployed in the soil or marine environment.

In these types of cells, water serves a double role: (i) water is the solvent of the salts that make up the electrolyte, and (ii) water acts as a fuel, on the cathode side, by accepting the electrons released on the anode side. Ruthenium (IV) oxide or another metal oxide or their mixtures in various mass ratios (the oxidizer) can serve as the cathode catalyst. Water consumes the electrons, according to Equation (1), in which the electrochemical reduction of water is catalyzed by an electroactive component of the cathode, including one or more of ruthenium (IV) oxide, $RuO_2 \cdot nH_2O$ (s), or another catalytically active metal oxide, including but not limited to $MnO_2$, or NiO, or oxyhydroxides, including but not limited to NiO(OH), or noble metals such as platinum or palladium. As Pt or Pd are needed in catalytic amounts, their use is not cost-prohibitive. It is also possible that $Fe_3O_4$ or $Co_2O_3$ may serve in this role of a catalytically active metal oxide, or that FeO(OH) or CoO(OH) may serve as a catalytically active metal oxyhydroxide. In Equation (1) the notation (aq) designates hydrated ions, (l) is the liquid phase, and (g) the gas phase.

$$H_2O(l) + 2e^- \rightarrow 2HO^-(aq) + H_2(g) \qquad (1)$$

During the reaction shown in Equation (1) the oxidation state of ruthenium changes from 4+ to 2+, via two-electron reduction, a reversible change in oxidation state by which $RuO_2 \cdot nH_2O$ mediates the reduction of water. These electrons are supplied by the anode reaction, which is the oxidation of an electroactive metal, M, including but not limited to zinc, magnesium, aluminum, tin, and their alloys, according to the generic Equation (2), where z=2 or 3. As the preferred embodiment for the anode is zinc, Equation (3) shows the oxidation of metallic zinc. The notations in Equations (2) and (3) represent the followings: (s)—solid, (aq)—hydrated ions, i.e., ions present in the aqueous solution.

$$M(s) \rightarrow M^{z+}(aq) + ze^- \qquad (2)$$

$$Zn(s) \rightarrow Zn^{2+}(aq) + 2e^- \qquad (3)$$

Electrons released by the active metal, e.g., zinc, travel through external leads, and their motion correspond to a current, able to power an external load.

An Example of an Embodiment of a Zinc-Water Battery System

In one implementation, the battery system can have a small volume, thus improving the energy storage density and permitting extended duration of battery operation via periodically adding controlled amounts of water to the system. FIG. 1 shows the schematic of an example of the battery system equipped with a water injection device.

As shown in FIG. 1, the addition of water from an external source to the mixing chamber is controlled by valve 124. This "refueling" of the battery system with water, i.e., the periodic addition of controlled amounts of water to the device (with or without mixing with a stock solution to enhance electrolyte performance) may increase the overall energy delivered by the battery and, consequently, may extend battery operation. This approach allows devising a more compact battery; the power system described here only needs to store a given volume of concentrated salt solution (electrolyte stock solution), rather than the much larger volume of dilute electrolyte, which is being used for operating the cell. As described in detail in the examples of the system below, the stock electrolyte is stored in container 114 as seen in FIG. 1, can be eventually diluted with water, which can be supplied to the system from an external water source by a liquid introduction system. Sea water or fresh water can be used for diluting the electrolyte stock solution, whichever is available from the surroundings of the battery system. In one implementation the water can be introduced into the battery system either by capillary forces or by forced convection. In another implementation, as shown in FIG. 1, water can be introduced using a pumping system 122, such as micro-pumps. Micro-pumps require low power, on the order of microwatts. Hence, the power consumption needed by the dilution of the stock solution can be either zero (e.g., when capillary action is exploited) or effectively negligible (e.g., when micro-pumps are utilized). As shown in FIG. 1, the mixing chamber 112 is used for diluting the concentrated stock electrolyte with water originating from an external source.

FIG. 1 shows a second reservoir for storing wash solution 116. The wash solution contains a cleaning and purging agent, such as an acid solution. A periodic rinse of the galvanic cell with the wash solution allows for rejuvenating the electrodes, and extending their operation time. Additionally, the active metal anode (made of Zn, Mg, Al, Sn, or their alloys) can be refreshed via mechanical means. Mechanical means for refreshing the active metal anode include but are not limited to, (i) swapping in a new section of the active metal or a whole active metal plate, and/or (ii) building in a rotational system, where fresh sections of a circular or cylindrical active metal plate could be revolved into the cell, so as to operate the cell with a previously unused part of the zinc surface, or (iii) the use of a slurry anode consisting of an electroactive metal mixed with an aqueous solution, where fresh slurry can be pumped or pressed into the cell as the anode is depleted during operation, for example, as described in U.S. Pat. No. 5,206,096, April 1993 and P. C. Foller, Journal of Applied Electrochemistry, 1986, 16 (4), 527-543. In a preferred embodiment, the anode used in the cell is metallic zinc or its alloy, the electrolyte being seawater, while the electrode rejuvenating solution is an acid dissolved in seawater.

Given that all battery components are nontoxic and environmentally benign (as opposed to known environmental toxins like lithium and organic solvents), such high energy density batteries are extremely suitable for underwater applications, in general, and for marine environment, in particular. Therefore, these battery systems can power a wide variety of sensors (e.g., for methane and hydrogen) or sensor network systems, used for precise, real-time, and temporal-spatial continuous aquatic environment monitoring. These battery systems can be used in scalable mobile underwater wireless sensor networks for various applications, including the monitoring of the health of rivers and lakes, as well as oceanographic data collection, pollution detection, and marine surveillance and control. In order to comply with the voltage and current requirements of such applications, one can use combinations of batteries that operate exclusively with seawater and batteries that use concentrated electrolyte. Such battery systems can be attached to each other in series or in parallel, to form battery banks that provide higher voltage and greater current, respectively; all these translate to greater power sourced by the battery bank.

Metal-water battery systems can be configured to be deployed in a marine environment, for which the batteries can continue supplying current even after the concentrated electrolyte solution is consumed. In this environment, for example, seawater can be used as the electrolyte for the batteries, which can then operate at a lower current drain than with an electrolyte based on the dilution of a stock solution. The seawater can offer the means for extending the operation time, and increasing the energy delivered by the cells.

Examples of Various Embodiments of the Electrochemical Energy Cell

The described features may also be implemented in one or more combinations of the following embodiments.

In one implementation, electrochemical energy cell designs may incorporate a structure serving as a "current collector." The anode and cathode electrode units have separate current collectors, serving as the anode current collector and cathode current collector, respectively. This current collector structure can be electrically conductive, and it may be chemically inert for the purposes of the battery operation. In one embodiment of the cell, this structure can be in electrical contact with a separate anode or cathode active material. With this electrical contact, this structure may collect electrons generated by the battery operation, and conduct them to the external load (in the case of an anode current collector) or may supply electrons from the outside to the battery operation (in the case of a cathode current collector). Also, positive and negative lead contacts can be electrically connected to the cathode electrode unit and the anode electrode unit, respectively.

Some embodiments may relate to a high charge capacity galvanic cell or battery, in which the cell or battery can include, as a cathode material, a powdery mixture of hydrated ruthenium oxide and/or other metal oxide particles and/or activated carbon particles, and possibly further conductivity-enhancing additives, suspended in an electrolyte. In addition to $RuO_2$, other metal oxides can be used in the powdery mixture. The choice of metal oxides includes but is not limited to $MnO_2$, NiO and mixtures of the above. Also, metal oxyhydroxides can be used in the cathode, including but not limited to NiO(OH). In some embodiments, this cathode material may be spread onto the cathode current collector. In other embodiments, this cathode material may be coated onto the cathode current collector by different printing techniques. The cathode current collector may take the form of a thin conductive sheet or thin conductive mesh.

As depicted by FIGS. 2A and 2B, some embodiments involve an electrochemical energy cell that has at least one battery cell including: an anode electrode unit 214; a cathode electrode unit 212; and an electrolyte body 210, sandwiched between the anode and cathode electrode units. In some implementations the electrolyte body 210 may be permeating a separator material or in other implementations may be contained in the space between the electrodes, where the space is controlled by a spacer, such as knit fabric (part number N274) supplied by Apex Mills (Inwood, N.Y.); in which the cathode electrode unit includes a cathode material containing a catalytic material capable of evolving hydrogen, which may also include one or more binders and one or more conductive additives. A variety of carbon additives can be used in the battery to the catalytic material, such as activated carbon, carbon black, graphite powder, carbon nanotubes, graphene, carbon nanofoam, and carbon fiber. This cell may be contained within a flexible packaging material such as polyethylene, polypropylene, or a laminate containing an outer heat-resistant layer, a foil middle layer, and a heat-sealable inner layer of the sort often used to contain lithium-ion batteries. In addition, fluid may be flowed into and out of the cell via the electrolyte inlet 218 and the electrolyte and gas outlet 216 by using cable glands to connect to lengths of tubing.

Some embodiments involve an electrochemical energy cell operated with a cathode electrode unit, which includes a cathode material consisting of one or more of ruthenium (IV) oxide, $RuO_2 \cdot nH_2O$ (s), another catalytically active metal oxide, including but not limited to $MnO_2$ or NiO, or oxyhydroxides, including, but not limited to NiO(OH), or noble metals such as platinum or palladium. The cathode current collector may take the form of a thin conductive sheet or mesh. In some embodiments, the cathode material may be coated onto the cathode current collector by a printing technique or, alternatively, may be electrodeposited conformally onto the current collector.

Some embodiments involve an electrochemical energy cell operated with a cathode electrode unit, which includes a cathode material having a mixture of a powder of the aforementioned catalytic material with particles of conductive carbon, including but not limited to activated carbon (AC), carbon black, or graphite powder.

Some aspects of some embodiments may involve a thin flexible prismatic battery or volumetric battery with high charge capacity that can have a maximized active surface for efficient electrochemical reactions in the cell, which can be attained by using a powdered mixture of hydrated ruthenium oxide particles and activated carbon particles or other types of carbon additives suspended in an electrolyte.

Some aspects of some embodiments may involve an electrochemical energy cell that may include at least one primary thin flexible battery unit, which can have any number of the flexible thin battery cells stacked on each other or by another arrangement, and connected in series or parallel. The connections in such a stack or combination may be internal or external to the packaging. Some aspects of some embodiments may involve an electrochemical energy cell that may include at least one primary volumetric battery unit, which can have any number of volumetric battery cells combined in any geometric arrangement that is feasible and advantageous (e.g. in terms of volume taken) and connected in series or parallel. The connections in such a combination may be internal or external to a common overall packaging.

As shown in FIG. 3, some additional embodiments may take the form of cylindrical, rather than planar configurations. FIG. 3 shows the schematic of a cylindrical volumetric cell. The cathode material 310 and the cathode current collector may be coated on the inside of a pipe or tube, which may be flexible or rigid, while the anode 312 is located in the center of the pipe or tube, and an electrolyte layer 314, contained in a porous separator or on its own (without a separator being present, but with a spacer) is sandwiched between the two electrodes. Alternately, a grid or mesh cathode current collector may be used, such that the cathode/cathode current collector assembly is freestanding. A spacer or spacers may be added to keep the anode within the center of the cell. In another implementation, a planar cathode may be used. The planar cathode may be coated with active materials on both sides, so that it operates as a cathode with both sides, and is inserted between two planar anodes.

Examples of Various Embodiments of a Material System for the Aforementioned Electrochemical Energy Cell Example Embodiment 1

For $ZnCl_2$-based electrolytes, the stock solution may be a 29.9 mol dm$^{-3}$ solution of $ZnCl_2$ in water, for which this concentration corresponds to the solubility of $ZnCl_2$ in water. The acidic zinc battery can operate efficiently with a more dilute electrolyte, which includes 4.32 mol dm$^{-3}$ $ZnCl_2$ solution in water. This represents a dilution coefficient of 6.9; for which, at each addition, 1 part of stock solution will be complemented with ~6 parts of water. This enables for a reduction of the size of the battery system by a factor of ~5, where the volume of electrodes and packaging materials is constant.

The operation time of the battery (assuming the same magnitude of current drawn from the cell) may be extended by a factor of ~7. Also, the energy delivered by the galvanic cell may increase by a factor of ~7. In one application, for example, this dilution coefficient would allow for augmenting the powering time of a 10 mW device with a 5 cm$^3$ battery system from 3.3-7.0 days (without external water supply) to 23-49 days (with added water).

Example Embodiment 2

The same $ZnCl_2$ stock solution is utilized as in Example Embodiment 1, but the battery is operated with an electrolyte that includes 0.393 mol dm$^{-3}$ $ZnCl_2$ in water. This concentration corresponds to a dilution coefficient of 76.1, which translates in 0.987 parts water added to 0.013 parts stock solution. This enables for a reduction of the size of the battery system by a factor of ~5, while extending its operation time (assuming the same magnitude of current drawn from the cell) by a factor of ~75. In addition, the energy delivered by the galvanic cell will increase by a factor of ~75. In one application, for example, this dilution coefficient would allow for augmenting the powering time of a 6 mW device with a 8 cm$^3$ battery system from 0.80-1.7 days (without an external water supply) to 60-128 days (with added water).

Example Embodiment 3

For the system described in Example Embodiment 2, but with a 5.5 cm$^3$ battery system, one can power an 8 mW device over 84 days by using 0.42 cm$^3$ of electrolyte stock solution and 31.6 cm$^3$ of water. Powering the same device over 365 days requires 1.83 cm$^3$ of electrolyte stock solution to which 137.5 cm$^3$ water are added, for example.

Example Embodiment 4

A stock solution consisting of a mixture of $ZnCl_2$ and $NH_4Cl$ is utilized, which contains 7.38 mol dm$^{-3}$ of $NH_4Cl$ and 2.46 mol dm$^{-3}$ of $ZnCl_2$. The galvanic cell or battery can operate with an electrolyte of 1.20 mol dm$^{-3}$ of $NH_4Cl$ and 0.400 mol dm$^{-3}$ of $ZnCl_2$, which corresponds to a dilution coefficient of 6.15, which translates in 0.837 parts of water added to 0.163 parts of stock solution. As a result, the capacity and operation time of the cell can increase by a factor of ~6. As one application, for example, this dilution coefficient would allow for extending the powering time of a 5 mW device, accomplished with a 6 cm$^3$ battery system, from 0.44-1.4 days (without external water supply) to 2.7-8.7 days (with added water).

Example Embodiment 5

The same stock solution is used as in Example 4, but the galvanic cell is operated with an electrolyte of 1.00 mol dm$^{-3}$ of $NH_4Cl$ and 0.333 mol dm$^{-3}$ of $ZnCl_2$, which corresponds to the dilution coefficient of 7.38; hence 0.136 parts of electrolyte stock solution can be diluted with 0.864 parts of water, and, as a result, the capacity and operation time of the cell will increase by a factor of ~7.4. As one possible application, this dilution coefficient would allow for extending the powering time of a 3 mW device, accomplished with a 4.5 cm$^3$ battery system, from 1.5-3.2 days (without external water supply) to 11-24 days (with added water).

Example Embodiment 6

The stock solution consists exclusively of 2-trimethylammonio acetate (known under the name of betaine) hydrochloride in water, at the concentration of 10.4 mol dm$^{-3}$. The galvanic cell can operate with an electrolyte of 0.900 mol dm$^{-3}$ of betaine, which corresponds to the dilution coefficient of 11.6; for which 0.086 parts of electrolyte stock solution can be diluted with 0.914 parts of water, and, as a result, the capacity and operation time of the cell can increase by a factor of ~11.5. In one application, for example, this dilution coefficient would allow for extending the powering time of a 5 mW device, accomplished with a 7.5 cm$^3$ battery system, from 2.2-4.7 days (without external water supply) to 26-55 days (with added water).

Example Embodiment 7

The same stock solution as used in Example 6, but the galvanic cell can operate with an electrolyte of 0.650 mol dm$^{-3}$ betaine, which corresponds to the dilution coefficient of 16, for which 0.067 parts of electrolyte stock solution can be diluted with 0.933 parts of water. As a result, the capacity and operation time of the cell increase by a factor of ~15. In one application, for example, this dilution coefficient would allow for extending the powering time of a 4 mW device, accomplished with a 5.5 cm$^3$ battery system, from 1.4-9.0 days (without external water supply) to 21-135 days (with added water).

Example Embodiment 8

The operation of the zinc-water battery can be extended by taking advantage of the availability of seawater when deployed in marine environment. After the battery system runs out of concentrated electrolyte (e.g., reservoir of concentrated electrolyte empties, see 1 in FIG. 1), the pumping system 122 can introduce seawater in lieu of the initial electrolyte, which enables for continuing battery operation, at lower current draw.

Example Embodiment 9

The operation of the zinc-water battery can be extended by taking advantage of the infinite availability of seawater when deployed in marine environment. The battery system may be run entirely based on seawater as the electrolyte, where the pumping system 122 can introduce seawater in the cell periodically, which enables for extending battery operation.

Example Embodiment 10

The system shown in FIG. 1 includes reservoir 116, which stores a cleaning and purging agent, such as concentrated hydrochloric acid. When concentrated acid is being used, it can be diluted with water in a ratio of 1:1000 by volume, by means of the same pump and mixing chamber as those used for the dilution of the electrolyte stock solution. Then, the obtained dilute hydrochloric acid solution, with a concentration of approximately 0.03-0.04 mol dm$^{-3}$, is used for rinsing the battery system. Periodic rinsing of the galvanic cell with this agent allows for rejuvenating the electrodes, and, by this, further extension of the operation time, increasing the delivered energy. The acidity of the hydrochloric acid wash solution corresponds to range pH 1.4-1.5, which, in underwater applications, can be released to the surroundings of the cell via the drain (see FIG. 1). Given that the hydrochloric acid wash solution would mix with a large amount of water, the solution will not be detrimental to the environment. Thus, when 2 mL of acidic wash solution are diluted with only 25 L of environmental water (e.g., corresponding to the dilution ratio of 1:12500, by volume), the mixture reaches pH 5.5-5.6, which represents to the acidity of normal precipitation.

Example Embodiment 11

For the same system as in Embodiment 10, the cleaning and purging agent may be a crystalline strong organic acid, including, but not limited to citric acid, tartaric acid, or fumaric acid. As in pure state these acids are solids, they need much less storage room than hydrochloric acid, for example. These organic acids are highly soluble in water, therefore, the cleaning and urging agent can be generated in the system (in situ), by supplying water from an external source. The periodic rinsing of the galvanic cell or battery with the solution of any of the organic acid solutions listed above may extend significantly the operation time of the galvanic cell or battery, and, consequently the magnitude of energy the system can deliver.

Example Embodiment 12

Figure 4:
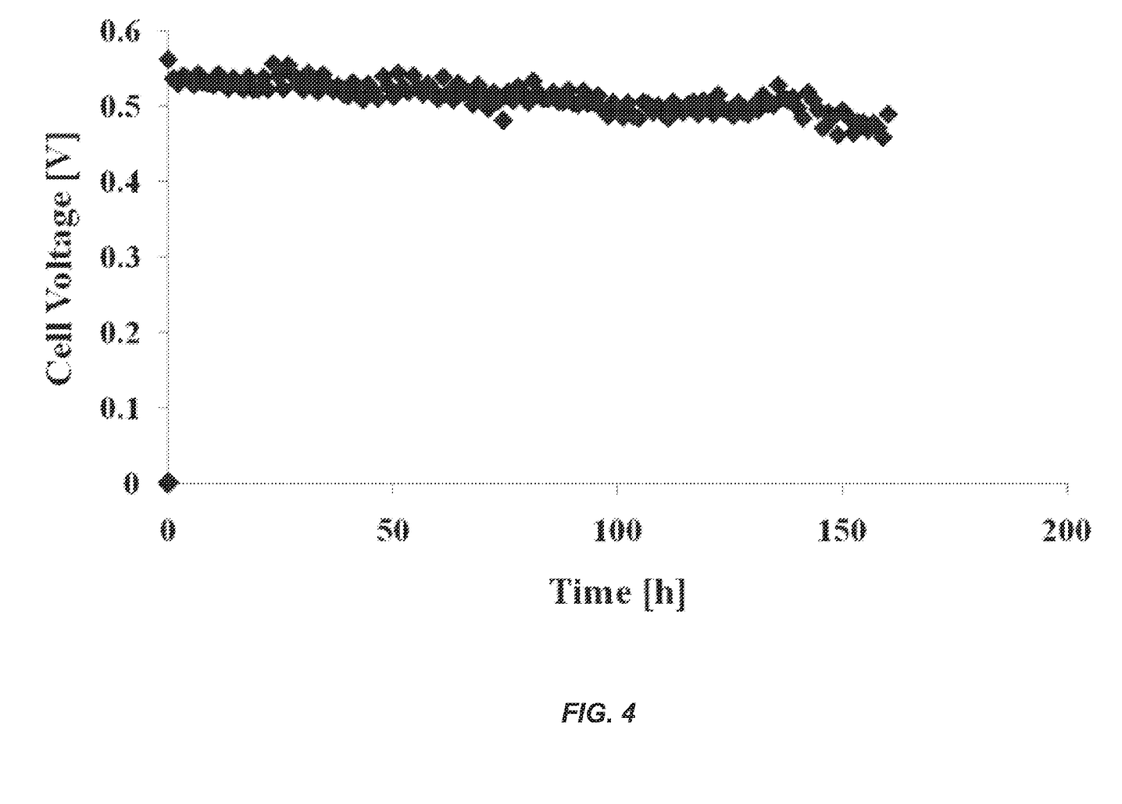
FIG. 4 displays the discharge curve of a zinc-seawater battery, with its electrodes periodically rejuvenated by washing with citric acid dissolved in seawater.

For the same system as in Embodiment 11, when the cell is deployed in marine environment, the cleaning and purging solution can be made by dissolving in seawater a crystalline organic acid, including but not limited to citric acid, tartaric acid, or fumaric acid. As revealed by the discharge curve displayed in FIG. 4, the periodic rinsing of the galvanic cell or battery with the solution of any of the organic acid solutions listed above extends significantly the operation time of the galvanic cell or battery, and, consequently the magnitude of energy the system can deliver. Each undulation in FIG. 4 corresponds to a wash of the galvanic cell with a solution of citric acid in seawater.

Example Embodiment 13

Alternatively, both the operation time and the magnitude of delivered energy can be increased by refreshing of the zinc anode via mechanical means, which can include, but not limited to (i) swapping in a new section of zinc or a whole zinc plate, and/or (ii) utilizing a rotational system, where fresh sections of a circular or cylindrical zinc plate could be revolved into the cell, so as to operate the cell with a previously unused part of the zinc surface, or (iii) using a slurry containing powdered or flake zinc in an aqueous electrolyte, where slurry is pumped into the cell to replace the anode as it is consumed (as described by S. Zaromb in U.S. Pat. No. 4,554,222, November 1985).

Examples of Various Embodiments of the Mechanical System for the Electrochemical Energy Cell In some implementations, pumps operating at flow rates of up to 1 $cm^3$ $min^{-1}$ are available at the approximate overall size of 0.1 $cm^3$. In some implementations, a reciprocating displacement micropump can secure a flow rate of 70 μL min-1 for water, with 700 Pa of operating pressure, a voltage of 2.3 V, and power consumption of 0.17 mW, for example. Such low power needs of the pumps may barely affect the calculated run times with the values staying within the reported ranges. The 1 $cm^3$ volume allocated to the Zn—$RuO_2$ power system can accommodate the battery components (electrodes, current collectors, separator, and packaging), the micropump, the solar panel, and the electronic circuits, as well.

For an example embodiment, Table I shows some of the calculations for the 0.17 mW pump. The total operation time of the pump and its energy need for servicing the 15 mW average power device over its 45 days mission time are provided in the table. The total energy of ~1.4 mWh used by the pump is covered by the energy harvested with solar cells, where a solar call may have a daily excess energy of 120 mWh.

TABLE I

An example of parameters of the reciprocating displacement pump and calculated total operation time and energy need over 45 days for the 15 mW device

| Parameter [unit] | Value |
|---|---|
| Flow rate [mL $min^{-1}$] | 0.07 |
| Volume of added water [mL] | 31.70 |
| Total operation time [min] | 453 |
| Total operation time [h] | 7.6 |
| Pump power [mW] | 0.17 |
| Total energy need [mWh] | 1.38 |

In an example embodiment, instead of implementing the pumping system 122, water delivery to the battery can be done via capillary action. Such capillary pumps, taking advantage of wicking in of water, are of extremely small size (e.g., less than 0.1 mL), and do not consume energy from an external power source.

In an example embodiment, instead of implementing the pumping system 122, water delivery to the battery can be accomplished by gravity when the cell is used in non-submerged applications, where the application allows setting the water supply to a more elevated position relative to the galvanic cell, the recipient components containing, respectively, concentrated electrolyte and wash solution.

In an example embodiment, when the battery system is deployed in the sea or in rivers, water delivery to the system can be achieved by exploiting the waves, streams, or water flow naturally present in the respective environment, instead of a pump.

The descriptions above are intended to illustrate possible implementations and are not restrictive. Many variations, modifications and alternatives will become apparent. For example, method steps equivalent to those shown and described may be substituted therefore, elements and methods individually described may be combined, and methodologies described as discrete may be distributed across many algorithm techniques. While this disclosure contains many specifics, these should not be construed as limitations or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. The scope of the disclosure should therefore be determined not with reference to only the particular descriptions above, but also with reference to the appended claims, along with their full range of equivalence.

LIST OF PART NUMBERS IN DRAWINGS AND DETAILED DESCRIPTION

FIG. 1 Battery System 100
110—Thin galvanic cell

112—Mixing chamber for diluting the stock electrolyte
114—Container for the concentrated electrolyte solution (stock electrolyte)
116—Container for the wash solution
118—Valve controlling the addition of stock solution
120—Valve controlling the addition of wash solution
122—Pumping system for introducing water from an external supply
124—Valve controlling the introduction of water in the mixing chamber
126—Valve controlling the drain of used electrolyte solution from the galvanic cell
128—Gas vent of the thin galvanic cell
FIGS. 2A and 2B Thin Galvanic Cell 200
210—Electrolyte body
212—Positive electrode (cathode)
214—Negative electrode (anode)
216—Electrolyte and gas outlet (shown as a syringe needle)
218—Electrolyte inlet (shown as tubing)
FIG. 3 Cylindrical Volumetric Cell 300
310—Positive electrode (cathode)
312—Negative electrode (anode)
314—Electrolyte layer
316—External packaging

What is claimed is:

1. A system comprising:
a mixing chamber;
a first reservoir in fluid communication with the mixing chamber, the first reservoir configured to store a concentrated electrolyte;
a pump configured to pump water into the mixing chamber;
an electrochemical energy cell in fluid communication with the mixing chamber,
wherein the mixing chamber is configured to: (i) receive the water and the concentrated electrolyte, and (ii) mix the water and the concentrated electrolyte to produce a diluted electrolyte;
wherein the electrochemical energy cell is configured to: (i) receive the diluted electrolyte, (ii) use the received diluted electrolyte for an electrochemical reaction, and (iii) remove the used electrolyte solution from the cell.

2. The system of claim 1, wherein the water is either fresh water or water containing salts.

3. The system of claim 1, wherein the electrochemical energy cell is an acidic zinc-based galvanic cell.

4. The system of claim 1, wherein the electrochemical energy cell is an active metal-based galvanic cell, where the active metal is zinc, magnesium, aluminum, or tin, or an alloy of the listed active metals.

5. The system of claim 4, wherein the electrochemical energy cell is configured to have an entire anode or at least some of the anode, made of zinc, magnesium, aluminum, tin, or a zinc alloy, or an alloy of the listed active metals, to be replaced with new metal of the same kind, to extend the operation time of the cell.

6. The system of claim 1, wherein an electroactive component of a cathode uses water in the cell reaction, and comprises one or more of the following: ruthenium (IV) oxide, $RuO_2 \cdot nH_2O$ (s), another catalytically active metal oxide, or noble metals.

7. The system of claim 6, where the cathode additionally contains a conductive additive including one of activated carbon, carbon black, graphite, graphene, and carbon nanotubes.

8. The system of claim 6, wherein the catalytically active metal oxide is $MnO_2$ and NiO or oxyhydroxides.

9. The system of claim 6, wherein the catalytically active metal oxide is NiO(OH).

10. The system of claim 6 wherein the noble metals are platinum or palladium.

11. The system of claim 1, wherein the electrochemical energy cell is a flexible cell capable of having fluids flowed therethrough;
the electrochemical cell being equipped with flexible electrodes, and contained within a flexible packaging material; and
the fluid is capable of flowing into and out of the electrochemical cell using cable glands to connect to lengths of tubing.

12. The system of claim 11, wherein the flexible packaging material contains polyethylene, polypropylene, or a laminate containing an outer heat-resistant layer, a foil middle layer, and a heat-sealable inner layer.

13. The system of claim 1, wherein the electrochemical energy cell comprises;
a cylinder through which fluids may be passed;
wherein a cathode material and a cathode current collector is coated on the inside of a pipe or tube within the cylinder;
an anode is located in the center of the pipe or tube;
the cathode and the anode being separated by a porous separator; and
an electrolyte layer is located in the space between the cathode and the anode;
wherein the electrolyte may be contained in the porous separator or in the space between the anode and cathode maintained by a spacer.

14. The system of claim 13, wherein the pipe or tube is flexible.

15. The system of claim 13, wherein the pipe or tube is rigid.

16. The system of claim 13, wherein the cathode and anode are separated by a spacer.

17. The system of claim 13, wherein the cylinder further comprises:
a grid or a mesh cathode current collector such that the cathode or the cathode current collector may be freestanding and such that the anode is kept within the center of the cell using spacers or a porous separator.

18. The system of claim 1, wherein the electrochemical energy cell is configured to use the dilute electrolyte as a fuel for power generation, where the dilute electrolyte is obtained by diluting a concentrated electrolyte stock solution with seawater, saltwater, or fresh water.

19. The system of claim 1, further comprising a second reservoir in fluid communication with the mixing chamber that contains a cleaning agent or a purging agent to be delivered to the electrochemical cell for a rinse of the cell, so as to extend the operating time of the cell.

20. The system of claim 19, wherein the cleaning agent is a solution of hydrochloric acid (HCl) in water or in seawater, with a concentration in the range from 0.050 to 1.2 mol $dm^{-3}$.

21. The system of claim 19, wherein the cleaning agent is a solution in water or in seawater of a solid organic acid with a concentration in the range from 1.5 to 200 g $dm^{-3}$.

22. The system of claim 21, wherein the solid organic acid is citric acid, tartaric acid, or fumaric acid.

23. The system of claim 19, wherein the cleaning agent is obtained by diluting a solid organic acid in water or in seawater.

24. The system of claim 1, wherein the pump comprises a capillary pump that does not have a requirement to consume energy from an external power source for operation.

25. The system of claim 1, wherein the system submerged in the sea or flowing fresh water environment takes advantage of wave motion, water currents, or water flow for refueling and washing the cell, so that the battery system does not have a requirement to consume energy from an external power source for operation.

26. The system of claim 1, wherein the system has power consumption on the order of microwatts or less.

27. The system of claim 1, wherein the water is brackish water or sea water.

* * * * *